Dec. 25, 1962 P. H. SERSON 3,070,745
PROTON PRECESSION MAGNETOMETER
Filed Feb. 1, 1960 2 Sheets-Sheet 1
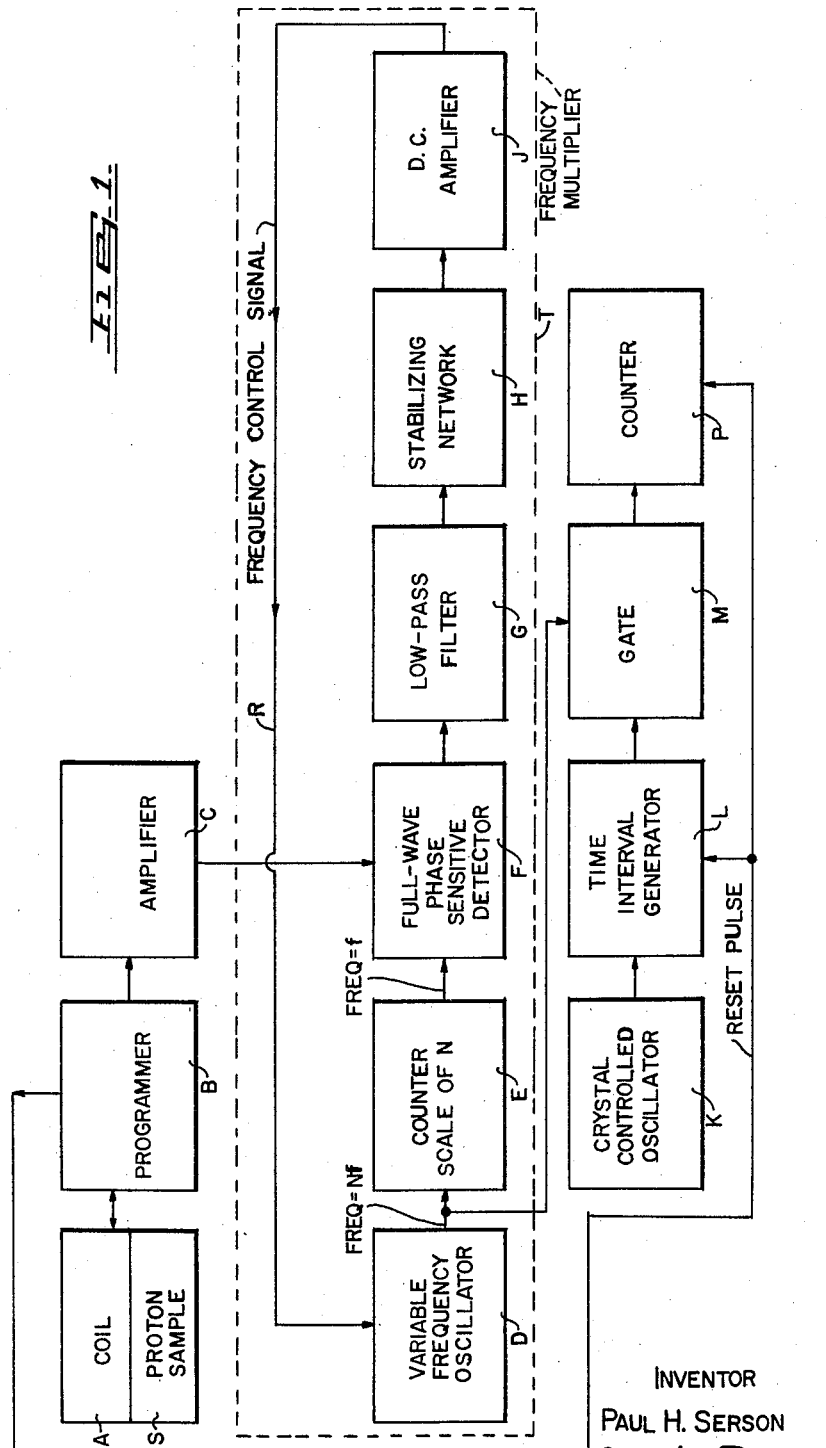
INVENTOR
PAUL H. SERSON
BY- *Smart & Biggar*
ATTORNEYS

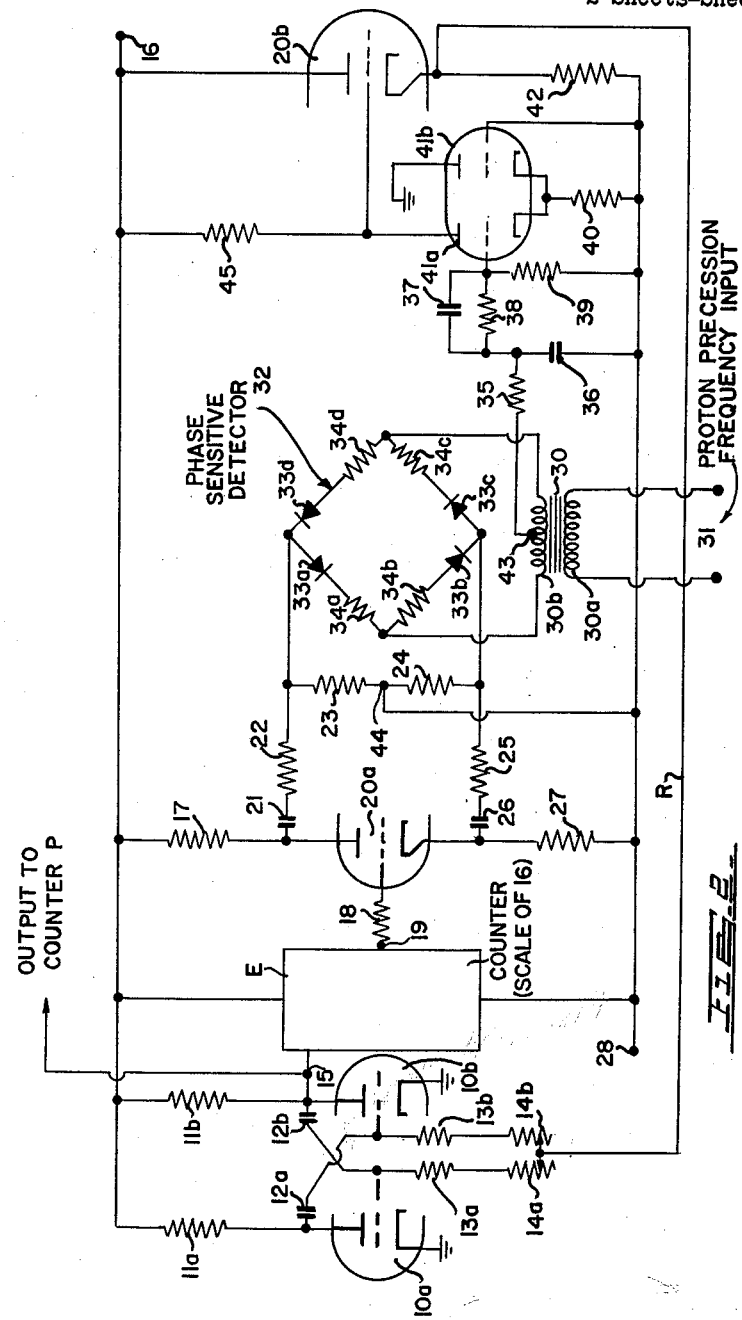

3,070,745
PROTON PRECESSION MAGNETOMETER

Paul H. Serson, Ottawa, Ontario, Canada, assignor to Her Majesty the Queen in right of Canada as represented by the Minister of Mines and Technical Surveys
Filed Feb. 1, 1960, Ser. No. 5,844
Claims priority, application Canada Nov. 30, 1959
6 Claims. (Cl. 324—.5)

This invention relates to proton precession magnetometers.

Proton precession magnetometers measure the intensity of magnetic fields by making use of the principle that the nuclei of atoms have the property of magnetic moment which is capable of interacting with external magnetic fields. If a nucleus having a non-zero value of magnetic moment is placed in an external magnetic field which is the resultant of two component fields which are inclined to one another, the magnetic moment vector of the nucleus will tend to line up in the same direction as that of the external magnetic field. If the magnetic moment of the nucleus is in line with the external magnetic field and one of the component fields is suddenly switched off, the nucleus will precess in the remaining component magnetic field in a manner analogous to the precession of a gyroscope in a gravitational field. The frequency of precession does not depend upon the angle between the component fields except that no precession occurs if the two fields have the same or exactly opposite directions. However, the frequency of precession is directly proportional to the intensity of the remaining component magnetic field. Thus, by determining this frequency (called the Larmor frequency), it is possible to determine the intensity of the remaining magnetic field.

The above discussion has referred to a single nucleus for purposes of simplicity, but in a practical apparatus the frequency of precession is determined from a sample of material containing a large number of protons. A sample of matter is used of which some of the protons can be polarized by a magnetic field. If this magnetic field collapses, these protons will precess in a second magnetic field whose intensity is to be measured. The precession produces a detectable signal whose frequency is the Larmor frequency. Water, kerosene, mineral oil, alcohol and benzine are among the substances which have been successfully used as proton samples for the measurement of the geomagnetic field. The atoms in the sample are subject to random thermal motion. However, if a coil of conducting material surrounds the sample, a direct current of sufficient strength through the coil will cause a net magnetic polarization of the nuclei in the sample. If the polarizing field is suddenly removed by shutting off current to the coil, the nuclei which were polarized will precess in any remaining field, for example the geomagnetic field. It is essential that the polarizing field be removed quickly, for otherwise the nuclei will lose their polarization due to thermal effects. Also, it is necessary that the field decay in a time short compared to the time for one cycle of the nuclear precession.

The frequency of precession may be determined by measuring the frequency of oscillation of current induced in a coil surrounding the proton sample. This coil may be the same as that used for polarizing the nuclei, or may be a different coil. Some difficulty may be encountered in screening the pick-up coil from unwanted transient fields. In this case, the use of one coil for both polarization and pick-up is advisable.

It is particularly with the measurement of the frequency of precession that the present invention is concerned. The straightforward way of measuring frequency electronically is to count the number of cycles in a fixed time interval. However, known frequency counters are not sufficiently accurate for measuring the Larmor frequencies in geomagnetic work. For example, if a proton sample of water is used in a representative geomagnetic field of 50,000 gammas (0.5 gauss), the Larmor frequency will be 2128.80 cycles per second. A typical counter with an accuracy of ±1 cycle will thus yield an accuracy of about ±25 gammas in a one-second determination of the intensity of this field. But the accuracy usually aimed at in geomagnetic measurements is ±1 gamma. The time interval for counting cannot be appreciably increased because the proton signal decays exponentially due to thermal effects and disappears into the noise within a few seconds.

Accordingly, prior workers in this field have measured the time required for a fixed number of cycles (say 1000) of the proton precession signal. The time can be measured to the required degree of accuracy by conventional methods. The frequency, which is inversely proportional to the measured time, can then be calculated, and the field strength obtained by multiplying by a constant of proportionality. This method has, however, a number of disadvantages. First, there is considerable calculation required to obtain the final answer. This becomes important if a large number of readings is required. For airborne magnetic prospecting, readings are taken at a rate of about 1 or 2 per second, often resulting in a very large number of readings. If the time measurement is presented in digital form and punched on a tape, as is customary, considerable expense is incurred through use of a digital computer to calculate the final data required. Analog methods of recording are unsatisfactory because the sensitivity of recording varies inversely with the total magnetic intensity, and the zero line of the recording corresponds to odd numbers of gammas rather than to multiples of 100 or 1000 gammas. Furthermore, this method of directly measuring time rather than frequency requires a relatively high signal-to-noise rato. For a measurement lasting one second, the signal-to-noise ratio must be greater than 15 to obtain an accuracy of one gamma. To obtain a high signal-to-noise ratio, the polarizing field must be strong, and must be applied for a time roughly equal to the measuring interval. This sets a lower limit on the power consumption of the instrument, which becomes important in portable equipment operated from batteries, and is critical in rocket-borne and satellite-borne measuring instruments. Also, for a high signal-to-noise ratio the bandwidth of the system must be narrow, and a complicated tuning system is thus required for measurements covering a large range of fields, as in airborne and satellite-borne applications.

The present invention overcomes the above difficulties by achieving a frequency multiplication of the precession frequency while increasing the signal-to-noise ratio by using a stabilizing network and a low-pass filter in a feedback loop. The multiplied frequency can then be measured to the required degree of accuracy, and the result multiplied by a constant of proportionately to give a direct reading of the geomagnetic or other field in suitable units (say gammas). Conventional methods of multiplying frequency are unsuitable for proton precession magnetometers. This is because such methods will operate only over a very narrow range of frequencies. Since the strength of the geomagnetic field can fluctuate over relatively wide ranges, the frequency of precession can also fluctuate over wide ranges, making conventional methods of frequency multiplication useless in this application.

The present invention provides a controlled variable frequency oscillator which can oscillate at frequencies which are N times as large as any of the precession frequencies which will be obtained. The number N is chosen so that sufficient accuracy may be obtained in the measurement of the oscillator frequency. The oscillator output is fed to a counter which gives exactly 1 cycle of output voltage for each N cycles of input voltage. The counter output is fed to a full-wave phase sensitive detector, which compares this output with that obtained from the proton sample, and produces an output whose frequency is the difference between the frequencies of the counter output and the proton sample. This output is then fed back to control the oscillator frequency. The effect of the feedback is to make the oscillator frequency synchronize at a value exactly N times the precession frequency. The oscillator frequency can be measured by a conventional counter, and the time interval for each count chosen so that a direct reading of the magnetic intensity in suitable units is obtained. This method is effective over the range of magnetic intensities encountered in geomagnetic surveys.

The invention has the advantage that the required information, i.e. the intensity of the magnetic field, is obtained directly in any desired units. No calculations are required. The invention will give an accuracy of the order of ±1 gamma from a proton precession signal which is considerably noisier than that required by the conventional method of measuring time rather than frequency, with corresponding advantages in power consumption and bandwidth. This is because the conventional method depends upon measuring the time interval between two discrete points on the proton signal, and noise occurring at either instant has a serious effect on the accuracy. However, the present invention determines the average frequency of the proton signal over the time period used, and thus the effect of noise of a random nature can be made very small by performing the averaging over many cycles of the proton signal. The effect of noise in the system is further reduced by inserting a low-pass filter in the feedback loop immediately following the phase-sensitive detector. The effective averaging period for the proton signal can then be chosen over a wide range by varying the time constants of the filter and of a stabilizing network inserted in the feedback loop to ensure its stability.

The invention will be further described with reference to the drawings, in which:

FIGURE 1 is a block diagram showing the flow of signal through the components of the direct-reading proton precession magnetometer; and FIGURE 2 is a schematic diagram of a preferred design of the circuit of the frequency multiplier of FIGURE 1.

A block diagram indicating the component parts of the magnetometer is shown in FIGURE 1. Each of the component parts is well known in the art. A proton sample S is surrounded by a coil A which, when energized by direct current, produces a magnetic field, thereby polarizing protons in the sample S. A sample of 500 cc. of water, surrounded by a polarizing coil producing 100 gauss in the sample, is suitable for geomagnetic applications. The polarizing coil must be capable of being switched off sufficiently rapidly to satisfy the conditions already described. Those protons which were polarized precess in any remaining magnetic field when the polarizing field collapses. The precession produces a current, whose frequency is the frequency of precession, in a pickup coil of high Q which surrounds the sample S. The pickup coil and the polarizing coil may be one and the same.

A programmer B controls the flow of current through coil A. At the beginning of each measuring interval, the programmer causes the sudden collapse of the polarizing magnetic field by shutting off current to the polarizing coil. When the polarizing field has been reduced to zero or nearly to zero, the programmer allows the pickup coil to transmit the signal caused by proton precession to an amplifier C. After sufficient time has elapsed for a frequency measurement to be made, the programmer re-energizes the polarizing coil in preparation for the next measurement. The programmer also synchronizes the operation of various other components of the system as described later.

A voltage-controlled variable-frequency oscillator D is provided to oscillate at frequencies which are N times the expected frequencies of proton precession, where N is the frequency multiplication. N is chosen to meet the particular problem at hand. For example, if the expected frequency of proton precession is about 2000 cycles, corresponding to a geomagnetic field of about 50,000 gammas acting on a sample of water, a frequency multiplication of 25 would give an output frequency of 50,000. A counter accurate to ±1 cycle would then give an accuracy of 1 part in 50,000 in a one-second reading or about ±1 gamma, which is the accuracy usually required in geomagnetic work. Thus a suitable value of N for this example would be 25.

The output of the oscillator D is fed to a counter E which gives 1 cycle of output for each N cycles of input. A full-wave phase-sensitive detector F mixes the separate signals received from the amplifier C and the counter E to obtain a D.C. output whose polarity is determined by the phase and frequency of the two signals. The D.C. output is fed through a low-pass filter G and a stabilizing network H to a D.C. amplifier J. The output of amplifier J is fed back through feedback loop R to control the frequency of oscillator D. The effect of the feedback is to force the oscillator D to synchronize at a frequency of oscillation which is N times that of the proton precession signal. When the oscillator frequency is exactly N times the precession frequency, the D.C. output produced by detector F is constant.

The counter E is a commercial decade (scale of 10) counter, such as Berkeley Model 705AH, which has been modified to give a scale of 16. Such scale of 10 counters are basically scale of 16 counters which have been changed to scale of 10 by the addition of two feedback paths operating from the 3rd binary stage to the 2nd, and from the 4th binary stage to the 3rd respectively. For use in the circuit of FIGURE 2, the counter is rewired as a scale of 16 simply by disconnecting these two feedback paths.

The low-pass filter G and the stabilizing network H are theoretically not necessary for the system to work. The low-pass filter substantially reduces the amount of noise fed back to the oscillator D, and the stability of the feedback loop is ensured by the use of the stabilizing network. Proper design of the filter, the oscillator and the feedback loop should enable the system to work for any practical application.

The output frequency of the oscillator D is measured by a counter P of standard design. In order that it will begin to count at the beginning of a measuring interval and not while the polarizing field is being applied to the sample, its operation is controlled by the programmer B. A reset pulse from the programmer B at the beginning of each measuring interval causes the counter P to begin a new count. If a time interval of one second is used as the counting period, the counter P will directly read the frequency of oscillator D.

However, it is usually desirable to obtain a direct reading of the magnetic field strength in appropriate units, rather than a reading of the oscillator output frequency. Accordingly, a time-interval generator L opens a gate M between the counter P and the oscillator D for a predetermined length of time. This has the effect of multiplying the oscillator frequency by a constant in order to give a direct reading of magnetic field strength in appropriate units. For example, if water is used, the Larmor frequency is 4257.60 cycles per second per gauss. Thus if a time interval of $$\frac{100{,}000}{4257.60N}$$

seconds is used for counting, the counter P will give a direct reading of the magnetic field strength in gammas (100,000 gammas=1 gauss). For a value of $N=32$, for example, the time interval should be 0.73398 second. The time interval generated can be kept accurate if a crystal controlled oscillator K is used by the time interval generator as a fixed-frequency reference.

After the coil A is connected by the programmer B to the amplifier C, a short interval of time, typically 0.25 seconds, should elapse before the measurement of frequency is begun. This is to allow transient signals in the amplifier C due to the switching action in programmer B time to decay, and to allow sufficient time for the frequency of the variable frequency oscillator D to reach exactly N times the proton precession frequency. Then the time interval generator L is started opening the gate M for the preset time interval. While the gate M is open, output pulses from the variable frequency oscillator D pass into the counter P. At the end of the preset time interval, gate M closes, and the reading of the counter P is the number of pulses produced by the variable frequency oscillator D in that time interval.

A convenient way of measuring the frequency of the variable frequency oscillator D is to feed its output directly into a commercial instrument which contains the crystal oscillator K, the time interval generator L, the gate M, and the counter P, such as the Berkeley Preset Universal Events per Unit Time Meter Model 7351 or 7361. The reset circuit of this instrument is connected to programmer B so that both the time interval generator L and the counter P are reset in preparation for the next measurement at the instant when the polarizing current is switched off from coil A. In the Berkeley instrument, provision is made for a delay of 0.015 second after resetting before a new frequency measurement will begin. This delay is easily increased to the 0.25 second mentioned in the preceding paragraph by increasing the value of one capacitor in the Berkeley instrument. The reading of the counter P may of course be recorded automatically, either in digital form by use of a digital printer or by punching paper tape or cards, or in analog form by a recording meter through the use of a digital to analog converter, or in any other useful manner.

FIGURE 2 is a schematic diagram of the frequency multiplier used in FIGURE 1. It shows components D, E, F, G, H, and J of FIGURE 1 in more detail. The particular circuit shown gives a frequency multiplication of 16.

The variable frequency oscillator D consists of a double triode 10a and 10b, together with associated resistors 11a, 11b, 13a, 13b, rheostates 14a and 14b, and capacitors 12a and 12b. The cathods of both sides of the double triode 10a, 10b are grounded. Power is supplied to the oscillator and to the other tubes in the circuit at terminal 16. Terminals 16, 28, and ground are connected to the power supply for the apparatus. The counter E in FIGURE 2 corresponds to counter E shown in FIGURE 1. The input to counter E is taken from the oscillator between terminal 15 and ground. The output of the counter, whose frequency is $1/N$ times the input frequency ($1/N=\frac{1}{16}$ in this case), is applied between terminals 19 and 28. This counter output signal is then amplified by triode 20a, which receives the signal through grid resistor 18. Power is supplied to triode 20a through plate resistor 17. The cathode of triode 20a is connected to cathode resistor 27, whose value is made equal to that of resistor 17. This provides signals of opposite phase and equal amplitude at the plate and cathode of triode 20a.

The output of triode 20a is fed through the balanced circuit composed of capacitors 21 and 26, and resistors 22, 23, 24 and 25 to a phase-sensitive detector 32, composed of diodes 33a, 33b, 33c, and 33d, and resistors 34a, 34b, 34c, and 34d. The detector also receives an input signal from the secondary winding 30b of the transformer 30. The input across terminals 31 is the proton precession signal after amplification, and is applied to the primary winding 30a of the transformer 30. The detector 32 produces a D.C. output which may be taken off between centre tap 43 of the secondary winding 30b and the terminal 44, which is the center point of the other input to the bridge. This output is fed to a low-pass filter which consists of a resistor 35 and a capacitor 36. A capacitor 37, and resistors 38 and 39 form a stabilizing network. The resistor 39 is also the grid resistor for a triode 41a. The signal from the stabilizing network feeds directly into the grid of a triode 41a, which receives power through a plate resistor 45. This triode amplifies the signal, and a triode 41b operates in grounded plate condition to keep the plate of 41a close to ground potential. The cathodes of the two triodes are held at the same potential by a cathode resistor 40. The output of the triode 41a is fed to the grid of a triode 20b, which is simply a cathode follower. The output of the triode 20b is taken across a cathode resistor 42, and used to control the frequency of the variable frequency oscillator by being fed back through the feedback loop R, the rheostats 14a and 14b and the resistors 13a and 13b. The rheostats 14a and 14b are used to center the frequency range of the oscillator on the required multiple (in this case, 16) of the proton precession frequency. The setting of the rheostats depends on the strength of the magnetic field to be measured. The output frequency of the oscillator can be determined by connecting the terminal 15 to a conventional frequency counter.

The following parts list gives examples of suitable values for the components of the circuit:

| | |
|---|---|
| Double triode 10a, 10b | 12AU7. |
| Double triode 20a, 20b | 12AU7. |
| Double triode 41a, 41b | 12AX7. |
| Counter E (scale of 16) | Berkely model No. 705AH, modified to give scale of 16. |
| Diodes 33a, 33b, 33c, 33d | IN476. |
| Transformer 30 | Hammond model No. 832. |
| Resistors 11a, 11b, 23, 24 | 22K. |
| Resistors 13a, 13b | 82K. |
| Resistor 18 | 1.0M. |
| Resistors 17, 27 | 47K. |
| Resistors 22, 25, 35 | 100K. |
| Resistors 34a, 34b, 34c, 34d | 33K. |
| Resistor 38 | 2.2M. |
| Resistor 39 | 147M. |
| Resistor 40 | 8.2K. |
| Resistor 45 | 1.8M. |
| Resistor 42 | 56K. |
| Rheostates 14a, 14b | 50K. |
| Capacitors 12a, 12b | 100 pf. |
| Capacitors 21, 26 | .05 mfd. |
| Capacitor 36 | 0.1 mfd. |
| Capacitor 37 | 0.002 mfd. |

The terminal 16 should be at +190 volts and the terminal 28 at −110 volts if the above parts list is used. If the input across the terminals 31 has a frequency of 2500 cycles per second, which is a representative frequency for geomagnetic fields acting on a sample of water, the output at terminal 15 will have a frequency of 40,000 cycles per second. The circuit of FIGURE 2 is useful for frequencies of this order of magnitude.

What I claim as my invention is:
1. A proton precession magnetometer for measuring the intensity of a magnetic field by determining the frequency of precession of protons caused to precess in the said magnetic field, comprising means adapted to sense the frequency of precession and to develop an output signal whose frequency is the frequency of precession, a variable-frequency oscillator whose frequency is controlled by a control signal, a counter responsive to the output of the variable frequency oscillator and adapted to produce one cycle of output signal for each N cycles of oscillator output signal, where N is a known number greater than one, means adapted to compare the signal whose frequency is the frequency of precession with the output signal of the counter so as to produce said control signal, a feedback loop for feeding back said control signal to the variable frequency oscillator thereby to cause the frequency of the output of the variable frequency oscillator to become N times the frequency of precession, a stabilizing network and a low-pass filter connected in said feedback loop, and means adapted to measure the frequency of the output of the variable frequency oscillator.

2. A proton precession magnetometer as claimed in claim 1, in which the means adapted to measure the frequency of the output of the variable frequency oscillator counts the cycles of oscillator output over a period of time chosen so as to give a direct reading of the intensity of the magnetic field to be measured in suitable units.

3. A proton precession magnetometer comprising a sample of matter of which some of the protons are capable of precessing in a magnetic field whose intensity is to be measured so as to produce a detectable signal whose frequency is the frequency of precession, means adapted to produce a polarizing magnetic field in the sample, means adapted to cause the collapse of said polarizing magnetic field so that protons in the sample precess in the magnetic field whose intensity is to be measured, a variable frequency oscillator whose frequency is controlled by a control signal, a counter adapted to receive the output of the oscillator and adapted to produce 1 cycle of output voltage for each N cycles of input voltage, where N is a known number greater than 1, a phase-sensitive detector adapted to compare the frequency and phase of the counter output voltage with the frequency and phase of proton precession so as to produce said control signal, a feedback loop for feeding back said control signal to the variable frequency oscillator so as to cause the frequency of oscillation of the oscillator to become N times the frequency of precession, a stabilizing network and a low-pass filter connected in said feedback loop, and a second counter adapted to count the number of cycles produced by the variable frequency oscillator in a known period of time.

4. A proton precession magnetometer as claimed in claim 3, in which the known period of time is chosen so as to give a direct reading by the counter of the magnetic intensity of the field to be measured in suitable units.

5. A proton precession magnetometer comprising a sample of matter some of whose protons are capable of precessing in a magnetic field whose intensity is to be measured so as to produce a detectable signal whose frequency is the frequency of precession, a coil of wire at least partially enclosing said sample and adapted to conduct electric current so as to induce a polarizing magnetic field in said sample, a programmer adapted to control the flow of current to the coil and adapted to cause the sudden interruption of said current so as to cause protons in the sample to precess in the magnetic field whose intensity is to be measured, means adapted to detect the frequency of precession of the protons and adapted to produce an output voltage of the same frequency, a variable frequency oscillator whose frequency is controlled by a control signal, a counter adapted to receive the output voltage of the oscillator and adapted to produce 1 cycle of output voltage for each N cycles of oscillator output voltage, where N is a known number greater than 1, a phase-sensitive detector adapted to receive the output voltages of the counter and of the means adapted to detect the frequency of precession of the protons, the detector being adapted to produce said control signal, a feedback loop which transmits said control signal to the variable frequency oscillator so as to cause the oscillator to oscillate at a frequency which becomes N times the frequency of proton precession, a stabilizing network and a low-pass filter connected in said feedback loop, a time-interval generator, a second counter, and a gate connected between the variable-frequency oscillator and the second counter, the second counter being adapted to count the number of cycles of output voltage of the oscillator while the gate is open, the gate being adapted to open for a time interval determined by the time interval generator, the time interval being caused to begin by a signal from the programmer, the said signal from the programmer causing the second counter to begin to count.

6. A proton precession magnetometer as claimed in claim 5, wherein the time interval during which the gate is open is chosen so that the second counter gives a direct reading of the magnetic intensity of the field to be measured in suitable units of magnetic intensity.

References Cited in the file of this patent

UNITED STATES PATENTS

| | | |
|---|---|---|
| 2,337,328 | Hathaway | Dec. 21, 1943 |
| 2,437,609 | Moyle | Mar. 9, 1948 |
| 2,856,579 | Packard | Oct. 14, 1958 |
| 2,987,674 | Shain | June 6, 1961 |

OTHER REFERENCES

Waters et al.: Geophysical Prospecting, vol. 4, No. 1, March 1956, pp. 1 to 9 incl.

Brooks: Electronics, vol. 32, No. 29, July 17, 1959, pp. 60, 61 and 62.

Hunter et al.: The Oil and Gas Journal, vol. 54, No. 66, August 6, 1956, pp. 144 and 145.

Waters et al.: Journal of Scientific Instruments, vol. 35, No. 3, March 1958, pp. 88 to 93.